United States Patent
You et al.

(10) Patent No.: US 11,582,659 B2
(45) Date of Patent: Feb. 14, 2023

(54) NETWORK DEVICE HANDOVER METHOD AND TERMINAL DEVICE

(71) Applicant: GUANGDONG OPPO MOBILE TELECOMMUNICATIONS CORP., LTD., Dongguan (CN)

(72) Inventors: Xin You, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/390,052

(22) Filed: Jul. 30, 2021

(65) Prior Publication Data

US 2021/0360494 A1 Nov. 18, 2021

Related U.S. Application Data

(63) Continuation of application No. PCT/CN2019/074302, filed on Jan. 31, 2019.

(51) Int. Cl.
*H04W 4/00* (2018.01)
*H04W 36/00* (2009.01)
*H04W 36/30* (2009.01)

(52) U.S. Cl.
CPC . *H04W 36/00835* (2018.08); *H04W 36/0061* (2013.01); *H04W 36/00837* (2018.08); *H04W 36/30* (2013.01)

(58) Field of Classification Search
None
See application file for complete search history.

(56) References Cited

U.S. PATENT DOCUMENTS

2016/0157283 A1* 6/2016 Yu ............... H04W 36/0033 455/437
2017/0289867 A1* 10/2017 Fan ............... H04W 36/38
(Continued)

FOREIGN PATENT DOCUMENTS

| CN | 107113673 A | 8/2017 |
|---|---|---|
| CN | 108243469 A | 7/2018 |

(Continued)

OTHER PUBLICATIONS

International Search Report issued in corresponding International Application No. PCT/CN2019/074302, dated Oct. 24, 2019, 26 pages.

(Continued)

*Primary Examiner* — Suhail Khan
(74) *Attorney, Agent, or Firm* — Bayes PLLC (57) ABSTRACT

An embodiment of the present disclosure relates to a handover method between network devices and a terminal device. The method includes receiving, by a terminal device, at least one handover command corresponding to a plurality of target network devices, the at least one handover command corresponding to the plurality of target network devices including a first handover command, and the first handover command including configuration information of a first target network among the plurality of target network devices; if the terminal device determines to establish a connection with the first target network device according to the first handover command, starting, by the terminal device, a first access timer corresponding to the first target network device; and establishing, by the terminal device, a connection with the first target network device according to the first access timer.

11 Claims, 4 Drawing Sheets

(56) References Cited

U.S. PATENT DOCUMENTS

| | | | |
|---|---|---|---|
| 2018/0227805 A1 | 8/2018 | Jang et al. | |
| 2021/0266999 A1* | 8/2021 | Laselva | H04W 72/04 |
| 2021/0297909 A1* | 9/2021 | Lee | H04W 36/0061 |
| 2021/0314833 A1* | 10/2021 | Hao | H04W 76/19 |
| 2021/0321306 A1* | 10/2021 | Bin Redhwan | H04W 74/0833 |
| 2021/0321308 A1* | 10/2021 | Yang | H04W 56/001 |

FOREIGN PATENT DOCUMENTS

| | | |
|---|---|---|
| CN | 108632926 A | 10/2018 |
| CN | 108886725 A | 11/2018 |
| CN | 109246770 A | 1/2019 |
| EP | 1734782 A1 | 12/2006 |
| GB | 2427324 A | 12/2006 |
| WO | 2018175721 A1 | 9/2018 |
| WO | 2018194326 A1 | 10/2018 |
| WO | 2018202187 A1 | 11/2018 |
| WO | 2018203716 A1 | 11/2018 |
| WO | 2018230997 A1 | 12/2018 |

OTHER PUBLICATIONS

PCT Written Opinion of the International Searching Authority issued in corresponding International Application No. PCT/CN2019/074302 dated Oct. 24, 2019, 8 pages.

"Report from break-out session on Rel-16 NR Industrial IoT SID and Rel-16 LTE even further mobility enhancements WID", Agenda item: 13.1.8, Source: Session chair (Nokia), 3GPP TSG-RAN WG2 Meeting #104, R2-1818528, Chengdu, China, Oct. 8-12, 2018, 7 pages.

Extended European Search Report issued in corresponding European Application No. 19913730.8, dated Dec. 20, 2021, 9 pages.

First Office Action issued in corresponding Indian Application No. 202117036686, dated Mar. 15, 2022, 8 pages.

CNIPA Patent Priority Review issued in corresponding Chinese application No. 202110808816.7, dated Aug. 26, 2022.

First Office Action issued in corresponding Chinese application No. 202110808816.7, dated Sep. 16, 2022.

First Office Action issued in corresponding European application No. 19913730.8, dated Oct. 31, 2022.

OPPO, "Discussion on failure handling of handover", R2-1816932, 3GPP TSG-RAN2 Meeting #104 Spokane, USA, Nov. 12-16, 2018.

Second Office Action issued in corresponding Chinese application No. 202110808816.7, dated Dec. 14, 2022.

* cited by examiner

NETWORK DEVICE HANDOVER METHOD AND TERMINAL DEVICE

CROSS-REFERENCE TO RELATED APPLICATION

This application is a continuation application of International Application No. PCT/CN2019/074302, filed on Jan. 31, 2019, the entire contents of which are incorporated herein by reference.

BACKGROUND

Embodiments of the present disclosure relate to communication technologies, and more particularly, to a method for handover between network devices and a terminal device.

In a handover (HO) procedure, user equipment (UE) starts a timer T304 when the UE receives a HO command. The timer T304 can limit the time for the UE to access a target base station to prevent the UE from continuously performing random access, and can also ensure the effective time of the resources configured by the target base station for the UE for random access.

In the existing HO procedure, the UE immediately initiates random access after receiving the handover command. The guarantee of resource availability and the restriction for the UE's access time can be implemented by the timer T304.

However, for conditional handover (CHO), the UE will not immediately perform the handover after receiving the HO command, but will monitor the configured target base station, and only starts to access the target base station when a condition is fulfilled. In other words, the time when the UE accesses the target base station is uncertain. If the existing timer T304 is used, the integrity of the working mechanism cannot be guaranteed.

SUMMARY

Embodiments of the present disclosure provide a method for handover between network devices and a terminal device, which can guarantee the integrity of the working mechanism during the handover procedure.

According to a first aspect, there is provided method for handover between network devices, including receiving, by a terminal device, at least one handover command corresponding to a plurality of target network devices, wherein the at least one handover command corresponding to the plurality of target network devices includes a first handover command, and the first handover command includes configuration information of a first target network device among the plurality of target network devices; starting, by the terminal device, a first resource timer corresponding to the first target network device according to the first handover command; and in a case that the first resource timer does not expire, determining, by the terminal device, whether to establish a connection with the first target network device according to the first handover command.

According to a second aspect, there is provided a method for handover between network devices, including receiving, by a terminal device, at least one handover command corresponding to a plurality of target network devices, wherein the at least one handover command corresponding to the plurality of target network devices includes a first handover command, and the first handover command includes configuration information of a first target network among the plurality of target network devices; if the terminal device determines to establish a connection with the first target network device according to the first handover command, starting, by the terminal device, a first access timer corresponding to the first target network device; and establishing, by the terminal device, a connection with the first target network device according to the first access timer.

According to a third aspect, there is provided a terminal device configured to perform the method according to the first or second aspect or any implementation of the first or second aspect. Specifically, the terminal device includes functional modules configured to perform the method according to the first or second aspect or any implementation of the first or second aspect.

According to a fourth aspect, there is provided a terminal device, including a processor and a memory. The memory is configured to store a computer program, and the processor is configured to call and run the computer program stored in the memory to perform the method according to the first or second aspect or any implementation of the first or second aspect.

According to a fifth aspect, there is provided a chip configured to implement the method according to the first or second aspect or any implementation of the first or second aspect. Specifically, the chip includes a processor configured to call and run a computer program stored in a memory to cause a device in which the chip is installed to perform the method according to the first or second aspect or any implementation of the first or second aspect.

According to a sixth aspect, there is provided a computer-readable storage medium configured to store a computer program, wherein the computer program is configured to cause a computer to perform the method according to the first or second aspect or any implementation of the first or second aspect.

According to a seventh aspect, there is provided a computer program product including computer program instructions that cause a computer to perform the method according to the first or second aspect or any implementation of the first or second aspect.

According to an eighth aspect, there is provided a computer program. When the computer program is run on a computer, the computer is caused to perform the method according to the first or second aspect or any implementation of the first or second aspect.

In the above technical solutions, in the CHO procedure, the resource timer and/or access timer corresponding to the target network device can be set in the terminal device. The resource timer is used to limit the validity of configuration/resource for the terminal device when performing handover, and the access timer is used to limit the access duration of the terminal device. In this way, the technical solutions can ensure the integrity of the working mechanism during the handover procedure, and ensure that the terminal device will not make unnecessary access attempts (for example, the network device has released resources and context for access, but the terminal device does not know whether the attempt is necessary, which leads to user access/handover failure).

DETAILED DESCRIPTION

Technical solutions in embodiments of the present disclosure will be described below with reference to drawings. The described embodiments are a part of the embodiments of the present disclosure, not all of the embodiments of the present disclosure. Based on the embodiments described herein, all other embodiments obtained by those of ordinary skill in the art without creative work shall fall within the protection scope of the present disclosure.

The technical solutions of embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figure 1:
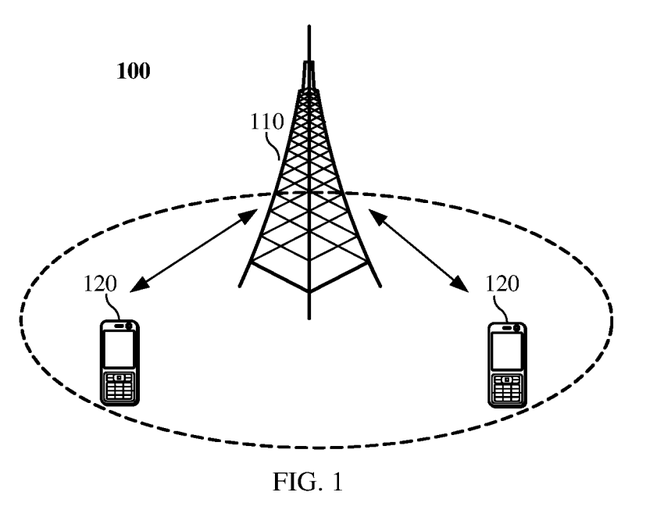
FIG. 1 is a schematic diagram of a communication system architecture according to an embodiment of the present disclosure.

As an example, the communication system 100 applied in embodiments of the present disclosure may be as shown in FIG. 1. The communication system 100 includes a network device 110, and the network device 110 may be a device that communicates with a terminal device 120 (or called a communication terminal or a terminal). The network device 110 can provide communication coverage for a specific geographic area, and can communicate with terminal devices in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

According to embodiments, Device to Device (D2D) communication may be performed between the terminal devices 120.

According to embodiments, the 5G system or 5G network may also be referred to as a New Radio (NR) system or NR network.

FIG. 1 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 1 as an example, the communication devices may include the network device 110 and the terminal devices 120 with communication functions, and the network device 110 and the terminal devices 120 may be the devices described above, which will not be repeated here. The communication devices may also include other devices in the communication system 100, such as other network entities such as a network controller or a mobility management entity, and embodiments of the present disclosure do not impose specific limitations on this.

It should be understood that the terms "system" and "network" are often used interchangeably herein. The term "and/or" herein describes an association relationship between associated objects, which means that there can be three relationships, for example, "A and/or B" can mean: A alone, B alone, and A and B together. In addition, the character "/" herein generally indicates that the associated objects before and after "/" are in an "or" relationship.

Figure 2:
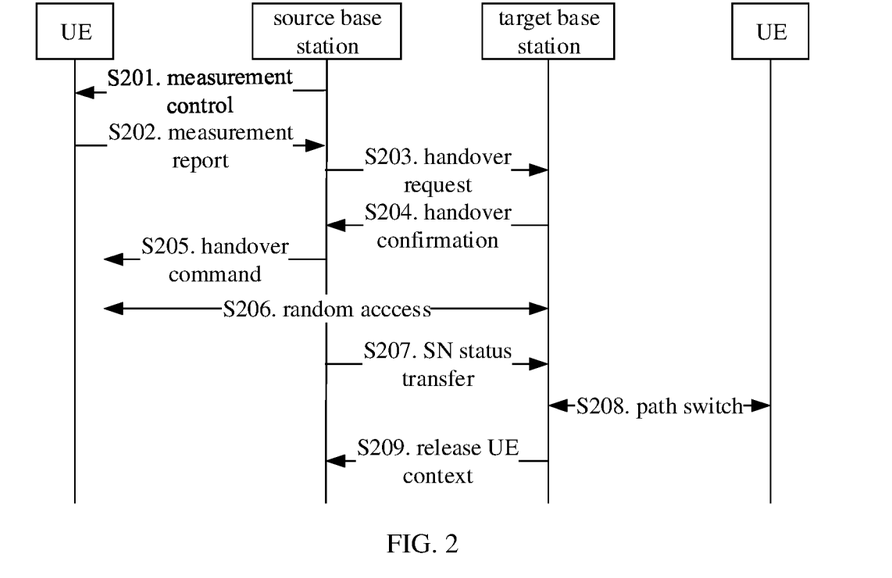
FIG. 2 is a schematic diagram of a handover method according to an embodiment of the present disclosure.

The existing handover procedure can be mainly divided into three stages: handover preparation, handover execution and handover completion. FIG. 2 is a schematic diagram of an existing handover procedure. The above three stages in the handover procedure will be briefly described below in conjunction with FIG. 2. It should be understood that FIG. 2 only shows a part of the processes in the handover procedure, not all the processes, and embodiments of the present disclosure are not limited to the shown processes.

As shown in FIG. 2, the handover preparation stage mainly includes steps S201 to S204.

In S201, measurement control is performed, and a source base station configures UE to perform measurement report.

In S202, measurement report is performed. The UE reports the measurement result to the source base station, so that the source base station determines whether the UE needs to be handed over to the target base station based on the measurement result.

In S203, handover request is sent. The source base station determines that the UE performs handover based on the measurement result reported by the UE, and then sends a handover request to the target base station.

In S204, handover confirmation is performed. After the handover request is agreed by the target base station, the target base station sends an ACK message to the source base station. In addition, the target base station also configures a Radio Resource Control (RRC) reconfiguration (RRC Connection Reconfiguration) message for the UE. The RRC message includes mobility control information, which may include a Random Access Channel (RACH) resource, a Cell Radio Network Temporary Identifier (C-RNTI), the security algorithm of the target base station and the system messages of the target base station, and so on.

The handover execution stage mainly includes steps S205 to S207.

In S205, a handover command is sent. The source base station sends a HO commend to the UE, and the HO commend can be used to forward the mobility control information to the UE by the source base station.

In S206, random access is performed. After receiving the HO commend, the UE initiates a random access procedure to the target base station.

In S207, Sequence Number (SN) status transfer (SN STATUS TRANSFER) is performed. When the UE initiates the random access procedure to the target base station, the source base station will send SN STATUS TRANSFER to the target base station to inform the target base station of uplink Packet Data Convergence Protocol (PDCP) SN receiving status and downlink PDCP SN sending status.

The handover completion stage mainly includes steps S208 to S209.

In S208, path switch is performed. After the UE successfully accesses the target base station, that is, after the random access is successful, path switch is performed between the target base station and a Mobility Management Entity (MME). Specifically, the target base station may send a PATH SWITCH REQUEST to the MME to request the MME to switch the downlink path, and the MME sends PATH SWITCH REQUEST ACK to the target base station to complete the path switch.

In S209, the UE context is released. After the path switch between the target base station and the MME is completed, the target base station instructs the source base station to release the UE context, and the handover is completed.

It should be understood that in the above handover procedure, multiple timers can be used to limit the handover procedure. For example, as shown in Table 1, four timers can be set during the above handover procedure, and the setting of each timer is shown in Table 1.

The timer T312 is started when the measurement report is triggered. If the timer expires, the UE returns to the IDLE state or initiates a connection re-establishment procedure. The premise of the timer T312 is that the timer T310 is running. When the UE receives multiple out-of-sync indications reported by the physical layer, the timer T310 is started. Because the timer T310 has a relatively long duration, the problem of handover too late cannot be avoided. For example, the HO command cannot be received for a long time, so the timer T312 is introduced to avoid the situation of handover too late.

When the UE receives the HO command, both timer T310 and timer T312 will stop.

The timer T304 and timer T307 are both started when the UE receives the Mobility Control Information included in the RRC Connection Reconfig. The timer T304 and timer T307 are used to ensure the effective time of the allocated RACH resources and restrict the time for the UE to access the target base station or Secondary Node (SN).

TABLE 1

| Timers | Start | Stop | at Expiry |
|---|---|---|---|
| T312 | upon receiving measurement report, while T310 is running | upon receiving N311 consecutive in-sync indications from lower layers; upon receiving handover command; upon triggering connection re-establishment procedure; and upon timeout of T310 | return to idle state; initiate connection re-establishment |
| T310 | upon receiving N310 consecutive out-of-sync indications from physical layers | upon receiving N311 consecutive in-sync indications from physical layers; upon receiving handover command; upon initiating connection | initiate RRC connection re-establishment; return to idle state |

TABLE 1-continued

| Timers | Start | Stop | at Expiry |
|---|---|---|---|
| T304 | upon receiving RRC Reconfiguration message including Mobility Control Info | re-establishment procedure successful completion of handover (successful completion of random access) | initiate RRC connection re-establishment |
| T307 | upon receiving RRC Reconfiguration message including Mobility Control Info SCG | successful completion of random access on PSCell | notify Evolved Universal Terrestrial Radio Access Network (E-UTRAN) Second Cell Group (SCG) failure |

However, for some special scenarios, for example, UE high-speed movement or high-frequency conditions, frequent handovers are required. Therefore, a new handover procedure is proposed, namely conditional handover (CHO). CHO avoids the problem that the handover preparation time is too long, causing the UE to switch too late. CHO can configure the HO command for the UE in advance. For the high-speed rail scenario, the UE's moving trajectory is specific, so the source base station can allocate the target base station to the UE in advance, and the HO command includes a condition for triggering the UE to perform handover. When the configured condition is fulfilled, the UE initiate an access request to the target base station.

Specifically, the 3GPP RAN2 #104 meeting has agreed to the conditional handover, and supports the configuration of multiple target cells in the HO command of the conditional handover. For example, FIG. 3 shows a schematic diagram of part of the CHO procedure.

Figure 3:
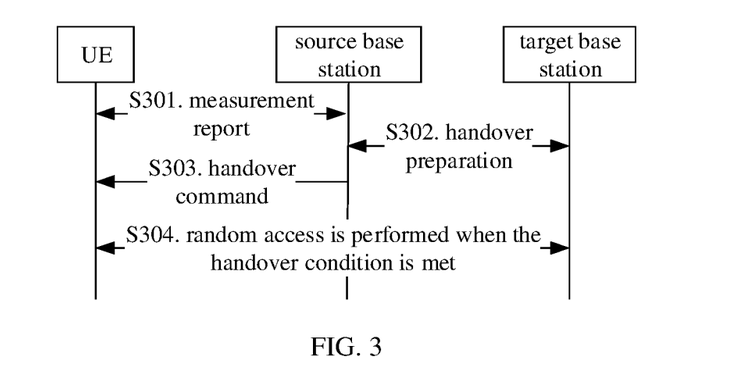
FIG. 3 is a schematic diagram showing part of the CHO procedure according to an embodiment of the present disclosure.

As shown in FIG. 3, in S301, measurement report is sent. Similar to the HO procedure, the UE sends the measurement report to the source base station. This step S301 can correspond to S201 and S202 in the HO procedure shown in FIG. 2 above. For brevity, details are not repeated here.

S302 is handover preparation. Similar to the HO procedure, handover preparation is performed between the source base station and the target base station. Specifically, the source base station may perform handover preparation with one or more target base stations. For example, the source base station may send a handover request to one or more target base stations. The handover preparation steps performed between the source base station and any target base station in S302 can correspond to S203 and S204 in the HO procedure shown in FIG. 2. For brevity, details are not repeated here.

In S303, handover command is sent. Multiple target cells or multiple target base stations can be configured in the handover command sent by the source base station to the UE. Optionally, a condition for the UE to perform handover can be configured so that the UE can, based on the configured condition, determine which target cell or target base station to access.

In S304, random access is performed when the handover condition is met. The UE determines whether the configured multiple target cells or target base stations meet the handover condition according to the configured condition, and performs random access when a certain target cell or target base station meets the condition.

In the existing HO procedure, the UE starts T304 when it receives the HO command, and uses T304 to limit the time for the UE to access the target base station and ensure the validity of resources. In addition, in the HO procedure, the UE immediately initiates random access after receiving the handover command. The guarantee of resource validity and the restriction of UE access time can be implemented by one timer.

But for conditional handover, the time when the UE accesses the target base station is uncertain. If the existing T304 is used, the integrity of the working mechanism cannot be guaranteed. Therefore, embodiments of the present disclosure propose a method for handover between network devices. When the UE performs conditional handover, the validity of the access resources can be guaranteed and the access time of the UE can be restricted.

Figure 4:
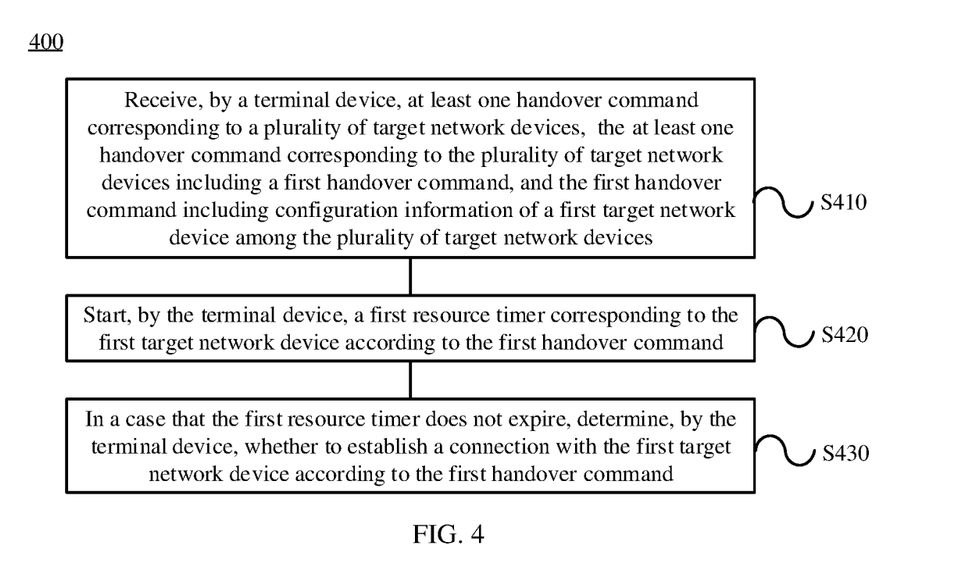
FIG. 4 is a schematic flowchart of a method for handover between network devices according to an embodiment of the present disclosure.

FIG. 4 is a schematic flowchart of a method 400 for handover between network devices according to an embodiment of the present disclosure. The method 400 may be performed by a terminal device, for example, the terminal device may be a terminal device as shown in FIG. 1. As shown in FIG. 4, the method 400 includes the following steps.

In S410, a terminal device receives at least one handover command corresponding to a plurality of target network devices. The at least one handover command corresponding to the plurality of target network devices includes a first handover command, and the first handover command includes configuration information of a first target network device among the plurality of target network devices.

In S420, the terminal device starts a first resource timer corresponding to the first target network device according to the first handover command.

In S430, in a case that the first resource timer does not expire, the terminal device determines whether to establish a connection with the first target network device according to the first handover command.

It should be understood that the method 400 can be used in a handover procedure, for example, a CHO handover procedure, that is, a scenario where the terminal device switches from a source network device to a target network device. The source network device in embodiments of the present disclosure may be any network device currently connected to the terminal device, for example, the network device shown in FIG. 1. The source network device is a relative term, and does not refer to a fixed network device. The target network device in embodiments of the present disclosure may also be any network device, and is not a fixed network device.

For example, if the terminal device is connected a network device 1 at a first time moment and it is determined that the terminal device needs to be switched to a network device 2, at this time, the network device 1 is the source network device and the network device 2 is the target network device. If the terminal device completes the handover at a second time moment and is successfully handed over to the network device 2, that is, the terminal device is currently connected to the network device 2, then the network device 2 is the source network device at the second time moment, and so on.

In embodiments of the present disclosure, when a terminal device needs to be handed over, for example, the CHO procedure is needed, the terminal device may be configured with at least one target network device correspondingly. That is, the terminal device may receive a handover command corresponding to at least one target network device. For example, the terminal device may receive a handover command corresponding to at least one target network device sent by the source target network device, and each handover command may correspond to one or more target network devices.

According to some embodiments, if one handover command corresponds to only one target network device, multiple target network devices correspond to multiple handover commands, and there is a one-to-one correspondence between the multiple target network devices and the multiple handover commands.

According to some other embodiments, one handover command may correspond to multiple target network devices, that is, multiple target network devices may correspond to one or more handover commands, and each handover command corresponds to one or more target network devices.

In the method 400, description is made by taking an example that the terminal device receives at least one handover command for multiple target network devices, and the multiple target network devices may correspond to one or more handover commands. In addition, the method 400 is described by taking the first handover command as an example, and the first handover command corresponds to a first target network device among the multiple target network devices. The first target network device is any one of a plurality of target network devices, and the first handover command may correspond to one or more target network devices, and the first target network device is any one of all target network devices corresponding to the first handover command.

It should be understood that, in embodiments of the present disclosure, the first handover command corresponding to the first target network device means that the first handover command includes the configuration information of the first target network device. Specifically, the first handover command may refer to RRC Connection Reconfiguration message including the mobility Control Information, and the first handover command may include configuration information of the first target network device. For example, first handover command may include at least one of RACH resource, C-RNTI, the security algorithm of the target base station and a system message of the target base station. Alternatively, the first handover command may also include other information. For example, in an NR system, the first handover command may also include a correspondence between multiple Synchronization Signal Blocks (SSBs) and RACH resources, and embodiments of the present disclosure do not impose specific limitations on this.

It should be understood that the first handover command may be sent by the source network device to the terminal device. For example, the configuration information of part or all of the target network devices included in the first handover command may be configured by the target network devices and are forwarded by the source network device to the terminal device, and embodiments of the present disclosure do not impose specific limitations on this.

In S420, the terminal device starts a first resource timer corresponding to the first target network device according to the first handover command. The first resource timer may correspond to one or more target network devices.

According to some embodiments, one resource timer may only correspond to one target network device, that is, the first resource timer may only correspond to the first target network device. The multiple target network devices determined by the terminal device in S410 correspond to multiple resource timers, and the multiple target network devices have a one-to-one correspondence with the multiple resource timers. When the terminal device receives a handover command for a certain target network device, the terminal device starts the corresponding resource timer.

According to some other embodiments, one resource timer may correspond to multiple target network devices, that is, the first resource timer may correspond to other target network devices in addition to the first target network device. For example, the first handover command corresponds to multiple target network devices, and the multiple target network devices may correspond to one resource timer. When the first handover command is received, the corresponding resource timer is started. The resource timer corresponds to multiple target network devices.

For ease of description, the first resource timer corresponding to the first target network device is taken as an example for description. The first resource timer may only correspond to the first target network device, and may also correspond to the first target network device and other target network devices, and the terminal device starts the first resource timer when receiving the first handover command corresponding to the first target network device. The embodiments of the present disclosure are not limited to this.

It should be understood that the first resource timer can be any type of timer. For example, the first resource timer can be a timer which starts counting from 0, and when the time exceeds a preset duration, timeout is indicated. Alternatively, the first resource timer may be a countdown timer, which counts down from a preset time length, and when the time is zero, the timeout is indicated. The embodiments of the present disclosure are not limited to this.

Optionally, the duration of the first resource timer in embodiments of the present disclosure can be configured in a variety of methods. For example, the first handover command may include the duration of the first resource timer; or, the duration of the first resource timer may be specified in a protocol; or, the duration of the first resource timer may be configured through other messages, for example, the duration of the first resource timer is configured through a system message, and embodiments of the present disclosure do not impose specific limitations on this.

In embodiments of the present disclosure, when the terminal device receives the first handover command, the terminal device starts the first resource timer corresponding to the first handover command. During the running of the first resource timer, the configuration information of the corresponding first target network device in the first handover command is valid, for example, the reserved resource for random access for the terminal device to access the first target network device is valid.

Therefore, in S430, if the first resource timer does not expire, the terminal device determines whether to establish a connection with the first target network device according to the first handover command. Specifically, the terminal device can determine whether handover to the first target network device can be performed according to the handover condition; if the first target network device meets the handover condition, and the first resource timer does not expire, the terminal device established the connection with the first target network device to perform handover.

It should be understood that the handover condition in embodiments of the present disclosure can be set according to actual applications, that is, the terminal device can determine whether handover to the first target network device can be performed in a variety of ways. For example, the handover condition may include the following: the terminal device can monitor the channel quality of the first target network device, and determine whether to switch to the first target network device and to establish a connection with the first target network device according to the monitoring result of the channel quality. The handover condition may include a handover threshold of channel quality. When the channel quality of the first target network device meets the handover threshold, the terminal device determines that the terminal device can be handed over to the first target network device; when the channel quality of the first target network device does not meet the handover threshold, the terminal device determines that the terminal device cannot be handed over to the first target network device.

It should be understood that the handover condition can be configured in a variety of manners. For example, the handover condition may be stipulated by a protocol; or, the first handover command may include the handover condition; or, the handover condition may be configured through other information, and embodiments of the present disclosure do not impose specific limitations on this.

In embodiments of the present disclosure, the terminal device may determine that the terminal device can be handed over to the first target network device according to the handover condition when the first target network device meets the handover condition, and perform handover when the first resource timer does not time out. Specifically, in the case that the first resource timer does not expire, if the first target network device meets the handover condition, the terminal device determines to switch to the first target network device and the terminal device successfully accesses the first target network device, the terminal device can perform at least one of the following steps: the terminal device stops the first resource timer; the terminal device stops a resource timer corresponding to a second target network device among the multiple target network devices; the terminal device deletes the configuration information of the second target network device; the terminal device sends indication information to the second target network device, the instruction information being used to indicate the second target network device to release a reserved resource for the terminal device; in the case that the resource timer corresponding to the second target network device does not expire, the terminal device determines whether to establish a connection with the second target network device.

For example, if the first resource timer only corresponds to the first target network device, since the terminal device has been successfully handed over to the first target network device, the terminal device may suspend the first resource timer. If the first resource timer corresponds to the first target network device and other target network devices, when the terminal device is successfully handed over to the first target network device, the first resource timer may be suspended, or the first resource timer may not be suspended.

For ease of description, the second target network device is taken as an example here, and the second target network device corresponds to the second resource timer. If the second target network device shares a resource timer with the first target network device, then the second resource timer and the first resource timer refer to the same timer; if the second target network device does not share a resource timer with the first target network device, the second resource timer and the first resource timer refer to two timers.

In a case that the terminal device has been successfully handed over to the first target network device, assuming that the second resource timer has not timed out, the terminal device may suspend the second resource timer, or may continue to maintain the second resource timer.

If the terminal device continues to maintain the second resource timer, the terminal device may determine whether the terminal device can be handed over to the second target network device if the second resource timer does expire. For example, the terminal device may monitor the channel quality of the second target network device when the second resource timer does not expire, and switch from the first target network device to the second target network device when the second target network device meets the handover condition. If the terminal device suspends the second resource timer, the configuration information of the second target network device is invalid. For example, the terminal device may delete the configuration information of the second target network device.

In addition, in a case that the terminal device has been successfully handed over to the first target network device, the second target network device may be notified to release a reserved resource for the terminal device. For example, indication information may be sent to the second target network device, and the indication information is used to indicate the second target network device to release the reserved resource for the terminal device. For example, the indication information may be used to indicate that the terminal device has successfully accessed the first target network device. The second target network device determines to release the reserved resource for the terminal device according to the indication information.

According to some embodiments, the first target network device may notify the second target network device to release the reserved resource; or, the first target network device notifies the source network device, and the source network device notifies the second network device to release the reserved resource; alternatively, the second target network device may be notified to release the reserved resource in other manners.

Conversely, in a case that the first resource timer does not expire, if the terminal device determines to establish a connection with the first target network device, but fails to access the first target network device, the terminal device can perform at least one of the following steps: the terminal device continues to access the first target network device; the terminal device selects a second target network device from the plurality of target network devices to perform access again, wherein the resource timer corresponding to the second target network device does not expire; the terminal device maintains the connection with the source network device; or the terminal device initiates the RRC connection re-establishment procedure.

It should be understood that the unsuccessful access to the first target network device in embodiments of the present disclosure may mean that the random access contention resolution fails, or the preamble transmission exceeds the maximum number of retransmissions, and embodiments of the present disclosure do not impose specific limitations on this.

Although the terminal device has failed to access the first target network device at this time, the first resource timer has not timed out, and the configuration information of the first target network device is still valid. Therefore, the terminal device can choose not to access any more or continue to access the first target network device.

According to some embodiments, the terminal device may select a second target network device from the plurality of target network devices to perform access again, wherein the resource timer corresponding to the second target network device does not expire. For example, if the second target network device and the first target network device may both correspond to the first resource timer and the first resource timer does not expire, the terminal device may determine whether to switch to the second target network device. Alternatively, the second target network device and the first target network device may correspond to different resource timers, and when the resource timer corresponding to the second target network device does not expire, the terminal device determines whether to switch to the second target network device. If the second target network device satisfies the handover condition and the resource timer corresponding to the second target does not expire, the terminal device may select the second target network device to perform access again.

According to some embodiments, the terminal device may choose to maintain the connection with the source network device; or, the terminal device may initiate the RRC connection re-establishment procedure, and embodiments of the present disclosure do not impose specific limitations on this.

In the above embodiments, the first resource timer does not expire. On the contrary, when the first resource timer expires, the terminal device may still not successfully switch to the first target network device. For example, the terminal device has determined to switch to the first network device, but the access fails; or, according to the handover condition, the terminal device may determine that the first target network device still does not meet the handover condition.

When the first resource timer expires, the configuration information of the first target network device is invalid, the terminal device may determine not to establish a connection with the first target network device, and at the same time, the terminal device may perform at least one of the following steps: the terminal device selects a second target network device from the plurality of target network devices to perform access again, wherein the resource timer corresponding to the second target network device does not expire; the terminal device maintains the connection with the source network device; or the terminal device initiates the RRC connection re-establishment procedure.

The foregoing describes the method 400 for handover between network devices according to an embodiment of the present disclosure with reference to FIG. 4. In the method 400, a timer for determining the validity of the configuration or resource during the handover is configured. The following will describe a method 500 for handover between network devices according to another embodiment of the present disclosure with reference to FIG. 5. In the method 500, a timer for limiting the access duration of a terminal device is configured.

Figure 5:
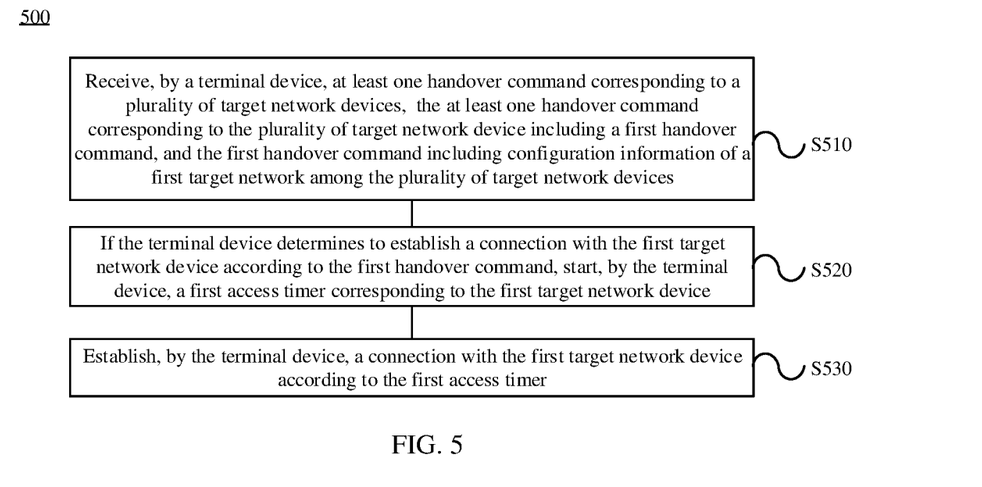
FIG. 5 is another schematic flowchart of a method for handover between network devices according to an embodiment of the present disclosure.

FIG. 5 shows a schematic flowchart of a method 500 for handover between network devices according to an embodiment of the present disclosure. The method 500 may be performed by the terminal device shown in FIG. 1. As shown in FIG. 5, the method 500 includes the following steps.

In S510, a terminal device receives at least one handover command corresponding to a plurality of target network devices. The at least one handover command corresponding to the plurality of target network devices includes a first handover command, and the first handover command includes configuration information of a first target network among the plurality of target network devices.

In S520, if the terminal device determines to establish a connection with the first target network device according to the first handover command, the terminal device starts a first access timer corresponding to the first target network device.

In S530, the terminal device establishes a connection with the first target network device according to the first access timer.

It should be understood that the application scenario of the method 500 is similar to that of the method 400, and can also be used in a handover procedure, such as a CHO handover procedure. The concepts of the source network device and the target network device are also consistent with those in the method 400. For the sake of brevity, repeated descriptions are omitted here.

It should be understood that step S510 in the method 500 corresponds to step S410 in the method 400, which is not repeated here for brevity.

In S520, the terminal device may determine whether to establish a connection with the first target network device according to the first handover command, and when determining to establish a connection with the first target network device, the terminal device may start the first access timer corresponding to the first target network device.

It should be understood that, in embodiments of the present disclosure, the terminal device may determine whether to switch to the first target network device according to the handover condition. If the first target network device meets the handover condition, and the first resource timer does not expire, the terminal device may establish a connection with the first target network device to perform handover. The handover condition corresponds to the handover condition in the method 400, which is not repeated here for brevity.

In embodiments of the present disclosure, if the terminal device determines to switch to the first target network device, that is, determines to establish a connection with the first target network device, the terminal device starts the first access timer corresponding to the first target network device. The first access timer is used to limit the access duration of the terminal device.

Specifically, the first access timer only corresponds to the first target network device, and different target network devices are correspondingly configured with respective access timers.

It should be understood that the first access timer may be any type of timer. For example, the first access timer can be a timer which starts counting from 0, and when the time exceeds a preset duration, timeout is indicated. Alternatively, the first access timer may be a countdown timer, which counts down from a preset time length, and when the time is zero, the timeout is indicated. The embodiments of the present disclosure are not limited to this.

Optionally, the duration of the first access timer in embodiments of the present disclosure can be configured in a variety of methods. For example, the first handover command may include the duration of the first access timer; or, the duration of the first access timer may be specified in a protocol; or, the duration of the first access timer may be configured through other messages, for example, the duration of the first access timer is configured through a system message, and embodiments of the present disclosure do not impose specific limitations on this.

In S530, the terminal device establishes a connection with the first target network device according to the first access timer. Specifically, in a case that the first access timer does not expire, if the terminal device successfully accesses the first target network device, the terminal device may perform at least one of the following steps: the terminal device stops the first access timer; the terminal device deletes the configuration information of the second target network device among the multiple target network devices; the terminal device sends indication information to the second target network device, and the indication information is used to indicate the second target network device to release a reserved resource for the terminal device; or the terminal device determines whether to establish a connection with the second target network device.

For example, the terminal device can suspend the first access timer after successfully accessing the first target network device, and the handover procedure ends; at the same time, the terminal device can delete the configuration information of the second target network device. The second target network device is other target network device than the first target network device.

For another example, in a case that the terminal device has successfully switched to the first target network device, the second target network device may be notified to release the reserved resource for the terminal device. For example, indication information may be sent to the second target network device, and the indication information is used to indicate the second target network device to release the reserved resource for the terminal device. For example, the indication information may be used to indicate that the terminal device has successfully accessed the first target network device. The second target network device determines to release the reserved resource for the terminal device according to the indication information.

According to some embodiments, the first target network device may notify the second target network device to release the reserved resource; or, the first target network device notifies the source network device, and the source network device notifies the second network device to release the reserved resource; alternatively, the second target network device may be notified to release the reserved resource in other manners.

For another example, the terminal device may continue to determine whether the terminal device can switch to the second target network device. For example, the terminal device may monitor the channel quality of the second target network device, and switch from the first target network device to the second target network device when the second target network device meets the handover condition.

Conversely, when the first access timer expires, if the terminal device still fails to access the first target network device (for example, the first target network device does not meet the handover condition all the time; or the first target network device meets the handover condition but the terminal device does not complete the access before the first access timer expires), then the terminal device may perform at least one of the following steps: the terminal device determines not to establish a connection with the first target network device; the terminal device selects a second target network device from the multiple target network devices to perform access again, and a second access timer corresponding to the second target network device is started; the terminal device maintains the connection with the source network device; or the terminal device initiates the RRC connection re-establishment procedure.

Because the terminal device still fails to access the first target network device before the first access timer expires, and the access duration is reached, the terminal device can determine that the terminal device will no longer access the first target network device. At the same time, the terminal device can select the second target network device to perform access again, and start a second access timer corresponding to the second target network device. The second target network device meets the access condition. Alternatively, the terminal device may maintain a connection with the source network device, or initiate RRC connection re-establishment, etc. Embodiments of the present disclosure do not impose specific limitations on this.

It should be understood that the foregoing method 400 and method 500 respectively describe that during the handover procedure, the first resource timer or the first access timer may be set for the first target network device. According to embodiments, any one of the two timers may be used in combination with other timers; or, the two timers can also be used in combination; or, the two timers can be used in combination with other timers, and embodiments of the present disclosure do not impose specific limitations on this.

In the following description, examples in which the first resource timer and the first access timer are used in combination are provided. Similar to the foregoing methods 400 and 500, the first resource timer corresponds to the first target network device, or may also correspond to other network devices, that is, the first target network device is any one of the target network devices corresponding to the first resource timer; the first access timer only corresponds to the first target network device.

The setting of the duration and the start time of the first resource timer and the first access timer are performed as described in the method 400 and the method 500. For the sake of brevity, details are not described herein again.

According to embodiments, in the case that neither the first resource timer nor the first access timer expires, if the terminal device successfully accesses the first target network device, then the terminal device may perform the at least one of following steps: the terminal device stops the first resource timer and the first access timer; the terminal device stops the resource timer corresponding to the second target network device among the plurality of target network devices; the terminal device deletes the configuration information of the second target network device; the terminal device sends indication information to the second target network device, and the indication information is used to indicate the second target network device to release a reserved resource for the terminal device; or if the resource timer corresponding to the second target network device does not expire, the terminal device determines whether to establish a connection with the second target network device.

It should be understood that in the case that neither the first resource timer nor the first access timer expires, if the terminal device successfully accesses the first target network device, the steps or actions performed by the terminal device may be the same as those described above in the method 400 when the terminal device successfully accesses the first target network device and the first resource timer does not expire, or the steps or actions performed by the terminal device may be the same as those described above in the method 500 when the terminal device successfully accesses the first target network device and the first access timer does not expire. For the sake of brevity, details are not repeated here.

According to embodiments, in the case that the first resource timer expires but the first access timer does not expire, if the terminal device does not successfully access the first target network device, the terminal device may perform at least one of the following steps: the terminal device determines not to establish a connection with the first target network device and stops the first access timer; the terminal device selects a second target network device from the plurality of target network devices to perform access again, and the resource timer corresponding to the second target network device does not expire; the terminal device maintains the connection with the source network device; or the terminal device initiates the RRC connection re-establishment procedure.

Since the first resource timer expires, the configuration information of the first target network device is invalid, and the terminal device no longer establishes a connection with the first target network device. At this time, the steps or actions of the terminal device can be the same as those in the above method 400 when the first resource timer expires and the terminal device still fails to successfully access the first target network device. For the sake of brevity, details are not repeated here.

According to embodiments, in the case that the first resource timer does not expire but the first access timer expires, if the terminal device does not successfully access the first target network device, the terminal device may perform at least one of the following steps: the terminal device determines not to establish a connection with the first target network device; the terminal device selects a second target network device from the plurality of target network devices to perform access again, and the resource timer corresponding to the second target network device does not expire; the terminal device maintains the connection with the source network device; or the terminal device initiates the RRC connection re-establishment procedure.

Since the first access timer expires, the access duration for the terminal device to access the first target network device is reached, the terminal device no longer establishes a connection with the first target network device. At this time, the steps or actions of the terminal device may be the same as the those of the terminal device in the above method 500 when the first access timer expires and the terminal device still fails to access the first target network device. For brevity, details are not repeated here.

It should be understood that when the first resource timer does not expire but the first access timer expires, if the terminal device chooses to switch to the second target network device, the terminal device needs to determine whether the resource timer corresponding to the second target network device expires. The second target network device may share a resource timer with the first target network device, or the first and second target network devices may correspond to different resource timers. In a case that the resource timer corresponding to the second target network device does not expire, if the second target terminal device satisfies the handover condition, the terminal device determines to switch to the second target network device; otherwise, the terminal device does not switch to the second target network device.

It should be understood that any resource timer or any access timer in embodiments of the present disclosure can reuse the timers in the existing HO procedure. For example, the timer T304 and/or T307 can be reused; or, new timers can be set. Embodiments of the present disclosure do not impose specific limitations on this.

Therefore, in the method for handover between network devices according to embodiments of the present disclosure, in the CHO procedure, the resource timer and/or access timer can be set. The resource timer is used to limit the validity of configuration/resource when performing handover, and the access timer is used to limit the access duration of the terminal device. In this way, the embodiments can ensure the integrity of the working mechanism during the handover procedure, and ensure that the terminal device will not make unnecessary access attempts (for example, the network device has released resources and context for access, but the terminal device does not know whether the attempt is necessary, which leads to user access/handover failure).

It should be understood that in various embodiments of the present disclosure, the sequence numbers of the above-mentioned processes do not mean the order of execution. The execution order of the processes should be determined by their functions and internal logic, and should not be construed as constituting any limitations on embodiments of the present disclosure.

In addition, the term "and/or" herein describes an association relationship between associated objects, which means that there can be three relationships, for example, "A and/or B" can mean: A alone, B alone, and A and B together. In addition, the character "/" herein generally indicates that the associated objects before and after "/" are in an "or" relationship.

The foregoing describes in detail the method for handover between network devices according to embodiments of the present disclosure with reference to FIGS. 1 to 5. The following will describe the terminal device according to embodiments of the present disclosure with reference to FIGS. 6 to 9.

Figure 6:
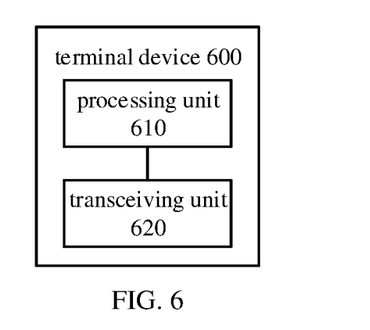
FIG. 6 is a schematic block diagram of a terminal device according to an embodiment of the present disclosure.

As shown in FIG. 6, a terminal device 600 according to an embodiment of the present disclosure includes a processing unit 610 and a transceiving unit 620. Optionally, the terminal device 600 can be used for performing the method 400 according to embodiments of the present disclosure.

The transceiving unit 620 is configured to receive at least one handover command corresponding to a plurality of target network devices. The at least one handover command corresponding to the plurality of target network devices includes a first handover command, and the first handover command includes configuration information of a first target network device among the plurality of target network devices.

The processing unit 610 is configured to start a first resource timer corresponding to the first target network device according to the first handover command.

The processing unit 610 is further configured to, in a case that the first resource timer does not expire, determine whether to establish a connection with the first target network device according to the first handover command.

According to an embodiment, the first handover command includes configuration information of at least one target network device among the plurality of target network devices, and the at least one target network device includes the first target network device.

According to an embodiment, the first resource timer corresponds to the at least one target network device.

According to an embodiment, the plurality of target network devices correspond to a plurality of handover commands, and the plurality of target network devices correspond to the plurality of handover commands one to one.

According to an embodiment, the plurality of target network devices correspond to a plurality of resource timers, and the plurality of target network devices correspond to the plurality of resource timers one to one.

According to an embodiment, in a case that the first resource timer does not expire, if the terminal device successfully accesses the first target network device, the processing unit 610 is configured to perform at least one of the following steps: stopping the first resource timer; stopping a resource timer corresponding to a second target network device among the plurality of target network devices; deleting configuration information of the second target network device; sending indication information to the second target network device by the transceiving unit 620, wherein the indication information is used to indicate the second target network device to release a reserved resource for the terminal device; or determining whether to establish a connection with the second target network device when the resource timer corresponding to the second target network device does not expire.

According to an embodiment, in a case that the first resource timer does not expire, if the terminal device determines to establish a connection with the first target network device and does not access the first target network device successfully, the processing unit 610 is configured to perform at least one of the following steps: continuing to access the first target network device; selecting a second target network device among the plurality of target network devices to perform access again, wherein a resource timer corresponding to the second target network device does not expire; maintaining a connection with a source network device; or initiating a Radio Resource Control (RRC) connection re-establishment procedure.

According to an embodiment, the first handover command includes a handover condition, wherein the processing unit 610 is configured to, in the case that the first resource timer does not expire, determine whether to establish the connection with the first target network device according to the handover condition.

According to an embodiment, the handover condition includes performing channel quality monitoring for the first target network device when the first resource timer does not expire; and determining whether to establish the connection with the first target network device according to a monitoring result of the channel quality.

According to an embodiment, if the first resource timer expires, the processing unit 610 is configured to determine not to establish a connection with the first target network device, and perform at least one of the following steps: selecting a second target network device among the plurality of target network devices to perform access again, wherein a resource timer corresponding to the second target network device does not expire; maintaining a connection with a source network device; or initiating an RRC connection re-establishment procedure.

According to an embodiment, when the terminal device determines to establish a connection with the first target network device, the terminal device starts a first access timer corresponding to the first target network device; and accesses the first target network device according to the first access timer.

According to an embodiment, in a case that none of the first resource timer and the first access timer expires, if the terminal device successfully accesses the first target network device, the processing unit 610 is configured to perform at least one of the following steps: stopping the first resource timer and the first access timer; stopping a resource timer corresponding to a second target network device among the plurality of target network devices; deleting configuration information of the second target network device; sending indication information to the second target network device by the transceiving unit 620, wherein the indication information is used to indicate the second target network device to release a reserved resource for the terminal device; or determining whether to establish a connection with the second target network device in a case that the resource timer corresponding to the second target network device does not expire.

According to an embodiment, in a case that the first resource timer expires and the first access timer does not expire, if the terminal device does not successfully access the first target network device, the processing unit 610 is configured to perform at least one of the following steps: determining not to establish a connection with the first target network device and stopping the first access timer; selecting a second target network device among the plurality of target network devices to perform access again, wherein a resource timer corresponding to the second target network device does not expire; maintaining a connection with a source network device; or initiating an RRC connection re-establishment procedure.

According to an embodiment, in a case that the first resource timer does not expire and the first access timer expires, if the terminal device does not successfully access the first target network device, the processing unit 610 is configured to perform at least one of the following steps: determining not to establish a connection with the first target network device; selecting a second target network device among the plurality of target network devices to perform access again, wherein a resource timer corresponding to the second target network device does not expire; maintaining a connection with a source network device; or initiating an RRC connection re-establishment procedure.

According to an embodiment, the first handover command includes a duration of the first access timer.

According to an embodiment, the first handover command includes a duration of the first resource timer.

It should be understood that the terminal device 600 according to embodiments may be used to implement the method 400 according to embodiments, and units in the terminal device 600 are used to implement the above and other operations and/or functions implemented by the terminal device in the method in FIG. 4. For the sake of brevity, details are not described herein again.

According to some other embodiments, the terminal device 600 may be used to implement the method 500 according to embodiments. Specifically, the transceiving unit 620 is configured to receive at least one handover command corresponding to a plurality of target network devices. The at least one handover command corresponding to the plurality of target network devices includes a first handover command, and the first handover command includes configuration information of a first target network among the plurality of target network devices.

The processing unit 610 is configured to, if it is determined to establish a connection with the first target network device according to the first handover command, start a first access timer corresponding to the first target network device.

The processing unit 610 is further configured to establish a connection with the first target network device according to the first access timer.

According to an embodiment, in a case that the first access timer does not expire, if the terminal device successfully accesses the first target network device, the processing unit 610 is configured to perform at least one of the following steps: stopping the first access timer; deleting configuration information of a second target network device among the plurality of target network devices; sending indication information to the second target network device by the transceiving unit 620, wherein the indication information is used to indicate the second target network device to release a reserved resource for the terminal device; or determining whether to establish a connection with the second target network device.

According to an embodiment, in a case that the first access timer expires, if the terminal device does not successfully access the first target network device, the processing unit 610 is configured to perform at least one of the following steps: determining not to establish the connection with the first target network device; selecting a second target network device among the plurality of target network devices to perform access again, and starting, a second access timer corresponding to the second target network device; maintaining a connection with a source network device; or initiating a Radio Resource Control (RRC) connection re-establishment procedure.

According to an embodiment, the first handover command includes a duration of the first access timer.

It should be understood that the terminal device 600 according to embodiments may be used to implement the method 500 according to embodiments, and units in the terminal device 600 are used to implement the above and other operations and/or functions implemented by the terminal device in the method in FIG. 5. For the sake of brevity, details are not described herein again.

Therefore, in the terminal device according to embodiments of the present disclosure, in the CHO procedure, the resource timer and/or access timer can be set. The resource timer is used to limit the validity of configuration/resource when performing handover, and the access timer is used to limit the access duration of the terminal device. In this way, the embodiments can ensure the integrity of the working mechanism during the handover procedure, and ensure that the terminal device will not make unnecessary access attempts (for example, the network device has released resources and context for access, but the terminal device does not know whether the attempt is necessary, which leads to user access/handover failure).

Figure 7:
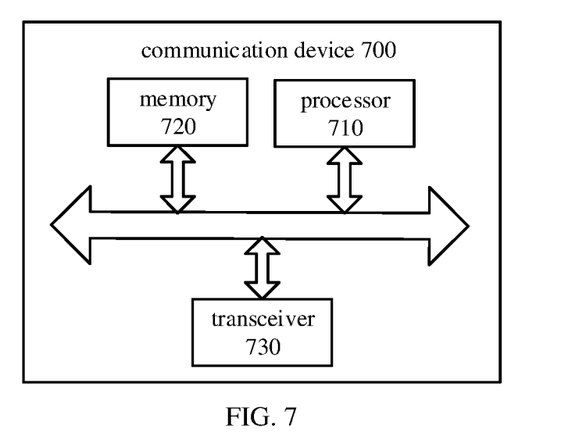
FIG. 7 is a schematic block diagram of a communication device according to an embodiment of the present disclosure.

FIG. 7 is a schematic structural diagram of a communication device 700 according to an embodiment of the present disclosure. The communication device 700 shown in FIG. 7 includes a processor 710, and the processor 710 may call and run a computer program from a memory to perform the method in embodiments of the present disclosure.

According to embodiments, as shown in FIG. 7, the communication device 700 may further include a memory 720. The processor 710 may call and run a computer program from the memory 720 to perform the method in embodiments of the present disclosure.

The memory 720 may be a separate device independent of the processor 710, or may be integrated in the processor 710.

According to embodiments, as shown in FIG. 7, the communication device 700 may further include a transceiver 730, and the processor 710 may control the transceiver 730 to communicate with other devices. Specifically, the transceiver may send information or data to other devices, or receive information or data sent by other devices.

The transceiver 730 may include a transmitter and a receiver. The transceiver 730 may further include one or more antennas.

According to embodiments, the communication device 700 may specifically be the network device according to an embodiment of the present disclosure, and the communication device 700 may implement the corresponding processes implemented by the network device in the method embodiments of the present disclosure. The network device may be a source network device, or a target network device. For brevity, details are not repeated here.

According to embodiments, the communication device 700 may specifically be the mobile terminal/terminal device in embodiments of the present disclosure, and the communication device 700 may implement the corresponding processes implemented by the mobile terminal/terminal device in the method embodiments of the present disclosure. For brevity, details are not repeated here.

Figure 8:
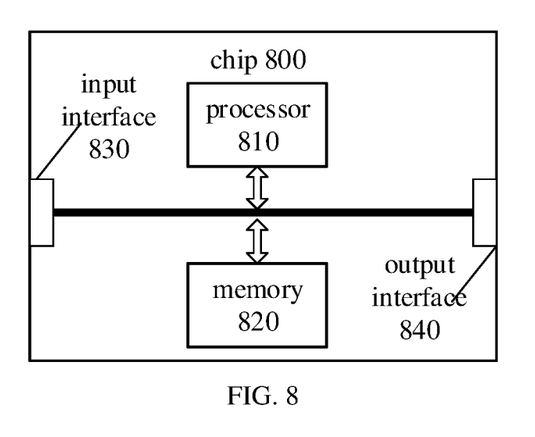
FIG. 8 is a schematic block diagram of a chip according to an embodiment of the present disclosure.

FIG. 8 is a schematic structural diagram of a chip according to an embodiment of the present disclosure. The chip 800 shown in FIG. 8 includes a processor 810, and the processor 810 can call and run a computer program from a memory to implement the method according to embodiments of the present disclosure.

According to embodiments, as shown in FIG. 8, the chip 800 may further include a memory 820. The processor 810 may call and run a computer program from the memory 820 to implement the method according to embodiments of the present disclosure.

The memory 820 may be a separate device independent of the processor 810, or may be integrated in the processor 810.

According to embodiments, the chip 800 may further include an input interface 830. The processor 810 may control the input interface 830 to communicate with other devices or chips, and specifically, the processor 810 can control the input interface to obtain information or data sent by other devices or chips.

According to embodiments, the chip 800 may further include an output interface 840. The processor 810 can control the output interface 840 to communicate with other devices or chips, and specifically, the processor 810 can control the output interface 840 to output information or data to other devices or chips.

According to embodiments, the chip can be applied to the network device in embodiments of the present disclosure, and the chip can implement the corresponding processes implemented by the network device in various methods according to embodiments of the present disclosure. The network device may be a source network device, or may be a target network device. For brevity, details are not repeated herein again.

According to embodiments, the chip can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 9:
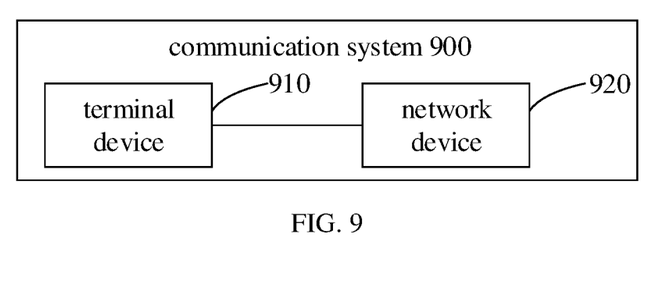
FIG. 9 is a schematic diagram of a communication system according to an embodiment of the present disclosure.

FIG. 9 is a schematic block diagram of a communication system 900 according to an embodiment of the present disclosure. As shown in FIG. 9, the communication system 900 includes a terminal device 910 and a network device 920.

The terminal device 910 may be used to implement the corresponding functions implemented by the terminal device in the foregoing methods, and the network device 920 may be used to implement the corresponding functions implemented by the source network device or target network device in the foregoing methods. For brevity, details are not repeated herein again.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A method for handover between network devices, comprising:
   receiving, by a terminal device, at least one handover command corresponding to a plurality of target network devices, wherein the at least one handover command corresponding to the plurality of target network devices comprises a first handover command, and the first handover command comprises configuration information of a first target network device among the plurality of target network devices;
   in response to that the terminal device determines to establish a connection with the first target network device according to the first handover command, starting, by the terminal device, a first access timer corresponding to the first target network device; and
   establishing, by the terminal device, a connection with the first target network device according to the first access timer;
   wherein establishing, by the terminal device, the connection with the first target network device according to the first access timer comprises:
   in a case that the first access timer expires, if the terminal device does not successfully access the first target network device, maintaining, by the terminal device, a connection with a source network device.

2. The method according to claim 1, wherein establishing, by the terminal device, the connection with the first target network device according to the first access timer comprises:
   in a case that the first access timer does not expire, if the terminal device successfully accesses the first target network device, stopping, by the terminal device, the first access timer.

3. The method according to claim 1, wherein the first handover command comprises a duration of the first access timer.

4. The method according to claim 1, further comprising:
   performing, by the terminal device, channel quality monitoring for the first target network device; and
   determining, by the terminal device, whether to switch to the first target network device according to a monitoring result of the channel quality.

5. The method according to claim 4, wherein determining, by the terminal device, whether to switch to the first target network device according to the monitoring result of the channel quality, comprises:
   in a case that the monitoring result of the channel quality for the first target network device meets a handover threshold, determining, by the terminal device, to switch to the first target network device.

6. A terminal device, comprising:
   a memory for storing computer programs;
   a transceiver; and
   a processor;
   wherein the processor is configured to execute the computer programs to:
   control the transceiver to receive at least one handover command corresponding to a plurality of target network devices, wherein the at least one handover command corresponding to the plurality of target network devices comprises a first handover command, and the first handover command comprises configuration information of a first target network device among the plurality of target network devices;
   in response to that the terminal device determines to establish a connection with the first target network device according to the first handover command, start a first access timer corresponding to the first target network device; and
   establish a connection with the first target network device according to the first access timer;
   wherein establishing, by the terminal device, the connection with the first target network device according to the first access timer comprises:
   in a case that the first access timer expires, if the terminal device does not successfully access the first target network device, maintaining, by the terminal device, a connection with a source network device.

7. The terminal device according to claim 6, wherein the processor is configured to, in a case that the first access timer does not expire, if the terminal device successfully accesses the first target network device, stop the first access timer.

8. The terminal device according to claim 6, wherein the first handover command comprises a duration of the first access timer.

9. The terminal device according to claim 6, wherein the processor is further configured to:
   perform channel quality monitoring for the first target network device; and determine whether to switch to the first target network device according to a monitoring result of the channel quality.

10. The terminal device according to claim 9, wherein the processor is further configured to:
in a case that the monitoring result of the channel quality for the first target network device meets a handover threshold, determine to switch to the first target network device.

11. A network device, comprising:
a memory for storing computer programs;
a transceiver; and
a processor;
wherein the processor is configured to execute the computer programs to control the transceiver to send at least one handover command corresponding to a plurality of target network devices to a terminal device, wherein the at least one handover command corresponding to the plurality of target network devices comprises a first handover command, and the first handover command comprises configuration information of a first target network device among the plurality of target network devices, so that the terminal device starts a first access timer corresponding to the first target network device in response to that the terminal device determines to establish a connection with the first target network device, wherein the terminal device establishes a connection with the first target network device according to the first access timer, and establishing, by the terminal device, the connection with the first target network device according to the first access timer comprises: in a case that the first access timer expires, if the terminal device does not successfully access the first target network device, maintaining, by the terminal device, a connection with a source network device.

* * * * *